(No Model.)
A. W. GRANT.
RUBBER TIRED WHEEL.
No. 554,675.  Patented Feb. 18, 1896.
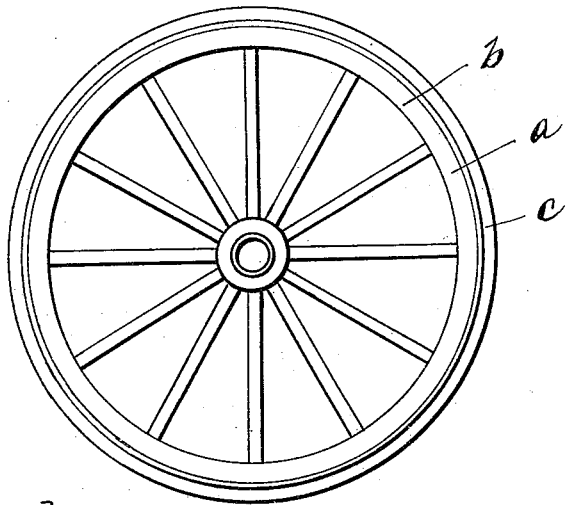
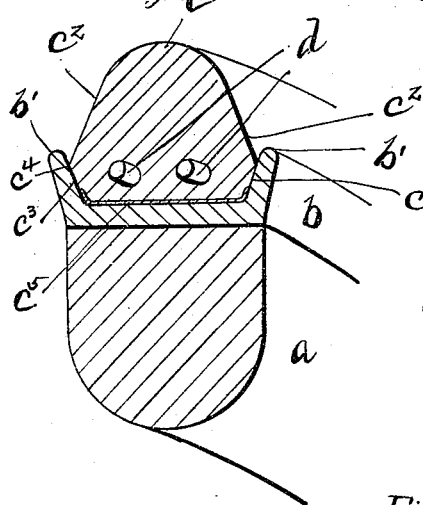
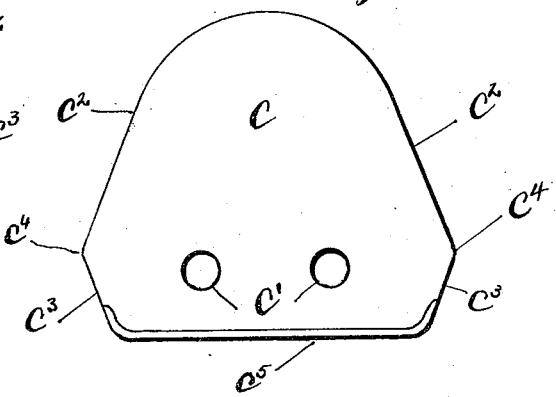
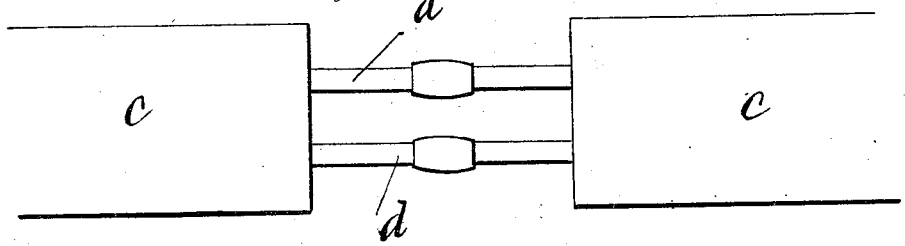
Witnesses
Chas. I. Welch
F. L. Walker
Inventor
Arthur W. Grant
By his Attorney

UNITED STATES PATENT OFFICE.

ARTHUR W. GRANT, OF SPRINGFIELD, OHIO.

RUBBER-TIRED WHEEL.

SPECIFICATION forming part of Letters Patent No. 554,675, dated February 18, 1896.

Application filed November 14, 1895. Serial No. 568,923. (No model.)

*To all whom it may concern:*

Be it known that I, ARTHUR W. GRANT, a citizen of the United States, residing at Springfield, in the county of Clark and State of Ohio, have invented certain new and useful Improvements in Rubber-Tired Wheels, of which the following is a specification.

My invention relates to improvements in rubber-tired wheels, and it especially relates to wheels designed for use on ordinary vehicles, such as wagons, buggies, and carriages.

My invention consists in the constructions and combinations of parts hereinafter described and set forth in the claims.

In the accompanying drawings, Figure 1 is a side elevation of a wheel embodying my invention. Fig. 2 is a sectional elevation of the wheel-rim, shown partly in perspective. Fig. 3 is a partial longitudinal section through the tire, showing the openings for the retaining-wires. Fig. 4 is a transverse sectional view of the rubber tire in detail.

Like parts are represented by similar letters of reference in the several views.

In constructing my improved rubber tire, I take an ordinary vehicle-wheel, preferably with a plain wooden felly $a$, and to this wooden felly $a$ I secure a metallic rim $b$, having at its edges outwardly-projecting flanges $b'$. These flanges $b'$ extend outwardly from the rim $b$ at an angle, so as to form a groove or channel having tapered or beveled sides, with the bottom of said groove or channel smaller in cross-section than the top. In this groove or channel I place a rubber tire $c$, which is of peculiar shape. This rubber tire is formed preferably of a single piece, but not continuous. It is provided throughout its length with openings $c'$ $c'$, through which are passed retaining-wires $d$. These retaining-wires are separate and independent and extend entirely through the openings $c'$, and the ends of each of said retaining-wires are united together after the rubber has been compressed endwise on said wires, thus forming two independent and continuous retaining-wires within the rubber tire, the ends of which, by reason of the compression, are brought together so as to entirely cover the wires and the united ends thereof.

The tire proper, $c$, is formed of substantially the same depth as width. The outer periphery, however, is formed on the arc of a circle of much smaller diameter than the width of the rim, the exposed sides of the tire being formed preferably on the lines $c^2$ at an angle to each other and also to the flanges $b'$ of the wheel-rim. The unexposed portion of the tire, or that portion which is inclosed within the rim, is formed of substantially the same shape as the inner channel of the rim—that is to say, it is tapered from the outside inwardly—so that the sides of the inner or unexposed portion of the tire are also formed on the lines $c^3$, forming with the lines $c^2$ an obtuse angle. The lines $c^3$, however, are less in length than the inside of the flanges $b'$, so that the angle or corner $c^4$ between the sides $c^2$ and $c^3$ falls below the outer periphery of the flange $b'$ and within the channel between said flanges. The openings $c'$ through which the retaining-wires pass are also formed within the inner or unexposed portion of the tire— that is to say, the tops of the openings are substantially on a line with the angle or corner $c^4$, so that the tops of said openings stand below the outer periphery of the flanges $b'$.

The bottom portion of the tire is reinforced with a canvas strip $c^5$, which covers the entire bottom and may project slightly along the sides $c^3$, but does not in any case extend up as far as the angle or corner $c^4$.

The tire has been described thus minutely because the constructions described are important. By having the sides of the exposed and unexposed portion of the tire formed inclined and at an angle to each other, as described, the compression of the tire in use is such that all portions of the rubber are retained within the channel or groove and no portion of the rubber is forced over the side of the flange, which would result in cutting or grooving the tire at the corner or angle, which would eventually cause the tire to break from this point inwardly to the openings $c'$. The reinforcing of the bottom of the tire by the canvas strip, which may be formed into the rubber, is desirable, as it has a tendency to prevent the breaking of the rubber below that portion of the tire which is between the retaining-wires and the rim. At the same time, by having the canvas strip wholly within the rim, all danger of stripping the edge of the canvas from the rubber, which would eventually result in a fracture of the rubber to the opening $c'$, is prevented.

It has been found in practice that by the constructions above described I produce a rubber-tired wheel-rim which is capable of more use and which will remain in position better than any other tire which has ever been put upon the market.

Having thus described my invention, I claim—

1. A vehicle-wheel having a metallic rim with angularly-projecting flanges to form a channel or groove with tapered or inclined sides, a rubber tire, the inner portion of which is adapted to fit in said groove or channel and the outer portion having sides at an angle to the inner portion, the angle or corner between the outer and inner portions being located within the outer periphery of the flanges, and independent retaining-wires passing entirely through the inner portions of said tire and also within the outer peripheries of the flanges, substantially as described.

2. A vehicle-wheel having a metallic rim with outwardly-projecting flanges at an angle to the plane of said wheel so as to form a channel or groove having tapered or inclined sides, a rubber tire, the inner portion of which is adapted to fit in said tapered groove or channel, and the outer or exposed portions formed at an angle thereto, the angle or corner between the said portions being placed within the outer periphery of said flanges, openings extending entirely through the unexposed portion of said tire, and independent retaining-wires in said openings, and a reinforcing-strip of fibrous material placed at the bottom of said tire and wholly within said flanges, substantially as specified.

In testimony whereof I have hereunto set my hand this 7th day of November, A. D. 1895.

ARTHUR W. GRANT.

Witnesses:
W. S. HUFFMAN,
E. P. CHRISTIE.